United States Patent
Li et al.

(10) Patent No.: US 12,078,004 B2
(45) Date of Patent: Sep. 3, 2024

(54) POWER STRUT WITH DIFFERENT ROTATIONAL FRICTION TORQUE

(71) Applicant: Magna Automotive Parts (Suzhou) Co., Ltd., Jiangsu (CN)

(72) Inventors: Guang Chun Li, Jiangsu (CN); Jiang Hao Chen, Jiangsu (CN); Ying Quing Xu, Jiangsu (CN)

(73) Assignee: Magna Automotive Parts (Suzhou) Co., Ltd., Suzhou (CN)

( * ) Notice: Subject to any disclaimer, the term of this patent is extended or adjusted under 35 U.S.C. 154(b) by 222 days.

(21) Appl. No.: 17/666,924

(22) Filed: Feb. 8, 2022

(65) Prior Publication Data
US 2022/0251892 A1 Aug. 11, 2022

(30) Foreign Application Priority Data

Feb. 9, 2021 (CN) .......................... 202120361856.7

(51) Int. Cl.
*E05F 3/18* (2006.01)
*F16F 13/00* (2006.01)

(52) U.S. Cl.
CPC .............. *E05F 3/18* (2013.01); *F16F 13/005* (2013.01); *E05Y 2201/10* (2013.01); *E05Y 2201/266* (2013.01); *E05Y 2201/484* (2013.01); *E05Y 2900/546* (2013.01); *F16F 2230/16* (2013.01); *F16F 2232/02* (2013.01); *F16F 2232/08* (2013.01); *F16F 2234/02* (2013.01); *F16F 2236/085* (2013.01); *F16F 2238/024* (2013.01)

(58) Field of Classification Search
CPC .. E05F 15/622; E05C 17/203; F16H 25/2454; F16H 2025/2463
See application file for complete search history.

(56) References Cited

U.S. PATENT DOCUMENTS

| | | | |
|---|---|---|---|
| 6,755,458 B1 | 6/2004 | Oberheide |
| 7,070,226 B2 | 7/2006 | Cleland et al. |
| 7,234,757 B2 | 6/2007 | Mitchell |
| 7,546,663 B2 | 6/2009 | Duffy |
| 7,566,092 B2 | 7/2009 | Paton et al. |
| 7,866,729 B2 | 1/2011 | Porat et al. |
| 9,388,865 B2 | 7/2016 | Oberle et al. |

(Continued)

FOREIGN PATENT DOCUMENTS

| | | |
|---|---|---|
| CN | 105987120 A | 10/2016 |
| CN | 104755783 B | 4/2017 |

(Continued)

*Primary Examiner* — T. Scott Fix
(74) *Attorney, Agent, or Firm* — Dickinson Wright PLLC (57) ABSTRACT

A power strut includes anisotropic damping device that provides different frictional torque on a rotatable member in response to rotation in opposite rotational directions. The anisotropic damping device includes a shell, the rotatable member, and a torsion spring. The shell includes a through hole, and the rotatable member extends through the through hole and is rotatably connected to the shell. The torsion spring is sleeved on the rotatable member and is in interference fit with the rotatable member, and the torsion spring is provided with a first leg fixedly connected to the shell. The rotatable member may include a shaft sleeve fixed to a rotating shaft, with the torsion spring in interference fit with the shaft sleeve.

18 Claims, 8 Drawing Sheets

(56) References Cited

U.S. PATENT DOCUMENTS

| | | | |
|---|---|---|---|
| 9,920,821 B2 | 3/2018 | Wu | |
| 10,871,019 B2 | 12/2020 | Scheuring et al. | |
| 2005/0039553 A1* | 2/2005 | Chen | F16H 25/20 74/22 R |
| 2007/0296243 A1 | 12/2007 | Borrmann et al. | |
| 2008/0250720 A1 | 10/2008 | Oxley et al. | |
| 2009/0200830 A1 | 8/2009 | Paton et al. | |
| 2015/0376929 A1 | 12/2015 | Scheuring et al. | |
| 2016/0069117 A1 | 3/2016 | Leonard et al. | |
| 2016/0144694 A1* | 5/2016 | Shchokin | B60J 5/107 475/331 |
| 2017/0044814 A1 | 2/2017 | Scheuring et al. | |
| 2019/0017311 A1 | 1/2019 | McGettrick et al. | |
| 2019/0106925 A1 | 4/2019 | McCorkell | |
| 2019/0128323 A1 | 5/2019 | Scheuring et al. | |
| 2019/0169907 A1 | 6/2019 | Leonard et al. | |
| 2019/0211604 A1 | 7/2019 | Scheuring et al. | |
| 2019/0211605 A1 | 7/2019 | Scheuring et al. | |
| 2019/0249477 A1 | 8/2019 | Leonard et al. | |
| 2020/0024883 A1 | 1/2020 | Scheuring et al. | |
| 2020/0123830 A1 | 4/2020 | Scheuring et al. | |
| 2020/0165856 A1 | 5/2020 | Scheuring et al. | |
| 2020/0190883 A1 | 6/2020 | Scheuring et al. | |
| 2020/0308889 A1 | 10/2020 | Scheuring et al. | |
| 2020/0408025 A1 | 12/2020 | Zeabari et al. | |
| 2021/0293293 A1* | 9/2021 | Krause | F16K 31/047 |
| 2022/0025692 A1 | 1/2022 | Henes et al. | |
| 2022/0186540 A1 | 6/2022 | Cappelli et al. | |

FOREIGN PATENT DOCUMENTS

| | | | |
|---|---|---|---|
| DE | 102009029167 A1 * | 6/2010 | B60N 2/443 |
| EP | 662573 A1 * | 7/1995 | F16H 25/20 |
| WO | 2013071236 A1 | 5/2013 | |
| WO | 2014043780 A1 | 3/2014 | |
| WO | 2015061885 A1 | 5/2015 | |
| WO | 2020220114 A1 | 11/2020 | |
| WO | 2020257949 A1 | 12/2020 | |

* cited by examiner

POWER STRUT WITH DIFFERENT ROTATIONAL FRICTION TORQUE

CROSS-REFERENCE TO RELATED APPLICATIONS

The present application claims the benefit of previously filed Chinese Patent Application No. 202120361856.7, filed Feb. 9, 2021, the entire content of which is hereby incorporated by reference in its entirety.

TECHNICAL FIELD

The present application relates to electromechanical strut systems, including power struts having a lead screw and an extensible member, and, in particular, to a damping device of an electromechanical device.

BACKGROUND

Electromechanical struts, including those with an extensible member, may include a damping device. The damping device may include a torsion spring with two legs in interference fit with a metal shaft (or a shaft sleeve), such as an output shaft. For example, an inner surface of the torsion spring is tightly sleeved on an outer surface of the shaft or shaft sleeve, and the legs of the torsion spring are fixed on a shell part. Because the legs of the torsion spring are fixed on the shell part, if the output shaft (or the shaft sleeve) is rotated, a friction torque will be generated on a matching surface between the torsion spring and the shaft, and the friction torque can be used as a damping in the system. However, in this mechanism, only one relatively constant torque value is provided in different rotation directions.

In view of the above, improvements can be made to damping devices for electromechanical struts.

SUMMARY

The present disclosure provides an anisotropic damping device and an electric telescopic mechanism to solve the problem that different torque values could not be generated in different rotation directions.

In one aspect, the present disclosure provides an anisotropic damping device. The anisotropic damping device includes a shell, a rotatable member and a torsion spring, where the shell is provided with a through hole, the rotatable member is inserted through the through hole and is rotatably connected to the shell, the torsion spring is sleeved on the rotatable member and is in interference fit with the rotatable member, and the torsion spring is provided with a first leg fixedly connected to the shell.

In one aspect, a frictional torque provided by the torsion spring to the rotatable member differs depending on the direction of rotation of the rotatable member relative to the shell.

In one aspect of the anisotropic damping device, the shell includes a first notch, the first leg is disposed in the first notch, and side walls of the first notch are fixedly connected to the first leg.

In one aspect of the anisotropic damping device, the torsion spring further includes a second leg, the shell further includes a second notch, and an opening width of the first notch is less than an opening width of the second notch.

In one aspect, the second leg is disposed in the second notch, the second leg has a first state in which the second leg abuts a first side wall of the second notch and a second state in which the second leg abuts a second side wall of the second notch, and the first side wall is opposite to the second side wall.

In one aspect of the anisotropic damping device, the rotatable member includes a rotating shaft and a shaft sleeve, where the shaft sleeve is sleeved around the rotating shaft and is fixedly connected to the rotating shaft, the torsion spring is sleeved around the shaft sleeve and is in interference fit with the shaft sleeve, and the shaft sleeve is inserted through the through hole and is rotatably connected to the shell.

In one aspect of the anisotropic damping device, the rotating shaft is provided with an external spline, the shaft sleeve is provided with an internal spline, the shaft sleeve is sleeved on the rotating shaft, and the internal spline is connected to the external spline.

In one aspect of the anisotropic damping device, the shaft sleeve is in interference fit with the rotating shaft.

In one aspect of the anisotropic damping device, the diameter of the through hole is less than the outer diameter of the torsion spring.

In one aspect of the anisotropic damping device, the rotatable member further includes a driving ring portion, the rotating shaft extends through the through hole of the shell and is fixedly connected to the driving ring, the driving ring is disposed spaced away from the shell, and the diameter of the driving ring portion is greater than the outer diameter of the torsion spring.

In one aspect of the anisotropic damping device, the shell is provided with a weight reduction groove.

In another aspect, the present application also provides an electric telescopic mechanism, electromechanical strut, or power strut, which includes the anisotropic damping device described above.

The electromechanical strut and damping device of the present disclosure provide the benefits described in further detail below.

In one aspect, the present disclosure provides an anisotropic damping device, including the shell, the rotatable member and the torsion spring, where the shell is provided with the through hole, the rotatable member is inserted through the through hole and is rotatably connected to the shell, the torsion spring is sleeved on the rotatable member and is in interference fit with the rotatable member, and the torsion spring is provided with the first leg fixedly connected to the shell.

In a case where a direction of turning of the installed torsion spring is right-handed, when the rotatable member is rotated counterclockwise, the torsion spring rotates counterclockwise along with the rotatable member, because the torsion spring is in interference fit with the rotatable member. In this case, because the first leg is fixedly connected to the shell, the torsion spring slightly expands, thereby reducing an interference amount between the torsion spring and the rotatable member and generating a relatively small friction torque. When the rotatable member is rotated in the other direction, such as clockwise, the torsion spring rotates clockwise along with the rotatable member because the torsion spring is in interference fit with the rotatable member. In this case, because the first leg is fixedly connected to the shell, the torsion spring is slightly tightened in a radial direction, thereby increasing the interference amount between the torsion spring and the rotatable member and generating a relatively large friction torque. The device of the present disclosure may therefore achieve the function of generating different torque values in different rotation directions.

In one aspect, a power strut is provided including: a housing; a drive mechanism disposed within the housing; a lead screw operatively connected to the drive mechanism, wherein rotation of the drive mechanism causes rotation of the lead screw; an extensible member operatively coupled to the lead screw, wherein rotation of the lead screw causes extension of the extensible member; an anisotropic damping device disposed between the drive mechanism and the lead screw, wherein rotation of the drive mechanism is transmitted to the lead screw via the damping device; wherein the anisotropic damping device includes: a shell having a through hole, a rotatable member extending through the through-hole, wherein the rotatable member is rotatable relative to the shell, and a torsion spring fixedly connected to the shell and extending around the rotatable member, the torsion spring in an interference fit relative to the rotatable member, wherein the torsion spring provides a frictional torque on the rotatable member in response to rotation of the rotatable member relative to the shell; wherein a frictional torque provided by the torsion spring to the rotatable member differs depending on the direction of rotation of the rotatable member relative to the shell.

In one aspect, the torsion spring includes a first leg fixedly connected to the shell.

In one aspect, rotation of the rotatable member in a first rotational direction tightens the torsion spring on the rotatable member and increases the frictional torque, and rotation of the rotatable member in a second rotation direction opposite the first rotational direction loosens the torsion spring on the rotatable member and decreases the frictional torque.

In one aspect, the torsion spring includes a second leg connected to the shell and moveable relative to the shell in response to rotation of the rotatable member.

In one aspect, the first leg is disposed within a first notch of the shell and the second leg is disposed within a second notch of the shell, wherein the second notch is larger than the first notch, and where rotation of the rotatable member in opposite rotation directions causes the second leg to contact opposing sides of the second notch.

In one aspect, the rotatable member includes a shaft sleeve extending around a rotational shaft portion and rotationally fixed thereto, wherein the torsion spring is in interference fit with the shaft sleeve.

In another aspect, a method of providing different frictional torque to a rotatable member, the method including: rotating a rotatable member relative to a shell (1), wherein the rotatable member extends through a through hole of the shell; during rotation of the rotatable member, providing frictional torque to the rotatable member by a torsion spring (3) that surrounds the rotatable member, wherein the torsion spring is in an interference fit relative to the rotatable member and fixedly connected to the shell; tightening the torsion spring on the rotatable member and providing a first frictional torque in response to rotating the rotatable member in a first rotational direction; loosening the torsion spring on the rotatable member and providing a second frictional torque in response to rotating the rotatable member in a second rotational direction that is opposite the first rotational direction, wherein the second frictional torque is less than the first frictional torque.

In one aspect, the torsion spring includes a first leg fixedly disposed in a first notch of the shell.

In one aspect, the torsion spring includes a second leg disposed in a second notch of the shell, wherein the second notch is larger than the first notch.

In one aspect, the second leg slides within the second notch during rotation of the rotatable member.

In one aspect, the second notch has opposite sides, wherein the second leg contacts the opposite sides in response to rotation in opposite rotational directions.

DETAILED DESCRIPTION

The details and benefits of the present disclosure are clearly and completely described below in conjunction with the drawings. It will be appreciated that the embodiments described herein are part, not all, of the embodiments and aspects of the present disclosure. Based on the embodiments and aspects of the present disclosure, all other embodiments obtained by those of ordinary skill in the art are within the scope of the present disclosure In the below description of the present disclosure, it is to be noted that the orientations or position relations indicated by terms such as "center", "upper", "lower", "left", "right", "vertical", "horizontal", "inside", "outside" and the like are based on orientations or positions shown in the drawings. These orientations or positions are intended merely to facilitate and simplify the description of the present disclosure, and not to indicate or imply that a device or element referred to must have such specific orientations or must be configured or operated in such specific orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present disclosure, it is to be noted that, unless otherwise expressly specified and limited, the term "mounting", "connected to each other", or "connected" is to be construed in a broad sense, for example, as securely connected, detachably connected, or integrally connected; mechanically connected or electrically connected; directly connected to each other or indirectly connected to each other via an intermediary; or internally connected between two elements. For those of ordinary skill in the art, specific meanings of the preceding terms in the present disclosure may be understood based on specific situations.

The embodiments and aspects of the present disclosure are described below in detail. Examples of the embodiments and aspects are shown in the drawings. The same or similar reference numerals indicate the same or similar elements or components having the same or similar functions. The embodiments and aspects described below with reference to the drawings are exemplary, merely used to explain the present disclosure, and are not to be construed as limiting the present disclosure.

Figure 1A:
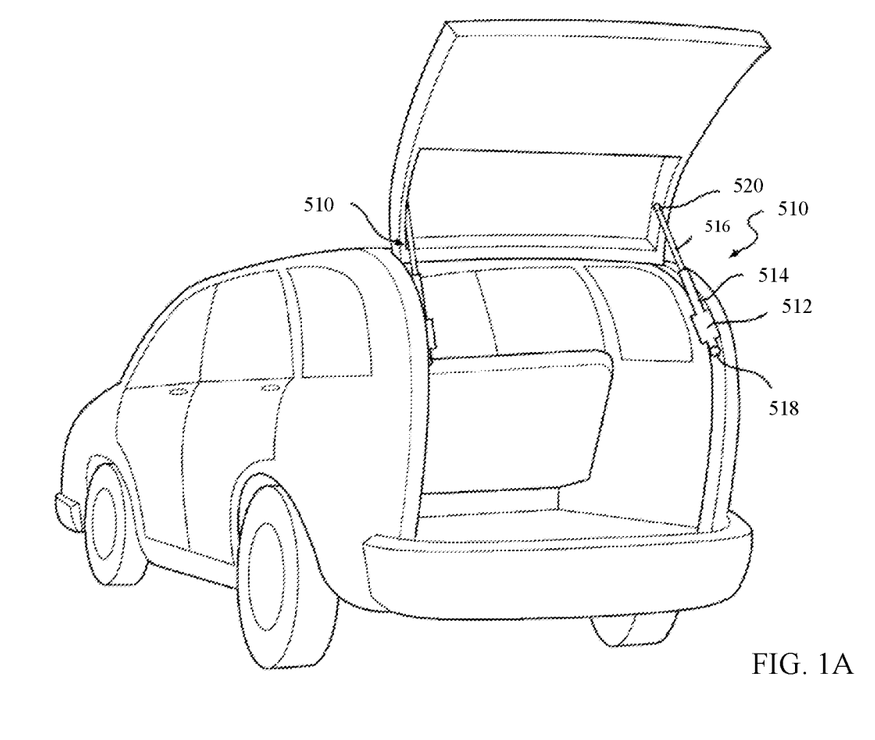
FIG. 1A is a perspective view of a vehicle having a power strut in accordance with the present disclosure.

Referring now to FIG. 1A, an embodiment of an electromechanical strut 510, also referred to as a power strut, is shown mounted to a motor vehicle. Electromechanical strut 510 includes a lower housing 512, an upper housing 514, and an extensible shaft 516. A first pivot mount 518, located at an end of lower housing 512, is pivotally mounted to a portion of the vehicle body that defines an interior cargo area in the vehicle. A second pivot mount 520 is attached to the distal end of extensible shaft 516 and is pivotally mounted to a lift gate 521 of the vehicle. It will be appreciated that the illustrated electromechanical struts 510, also referred to as a power strut, may be used in other areas where similar linear actuators are used. It will be further appreciated that other types of power struts with extensible members may also be used in accordance with the present disclosure.

Figure 1B:
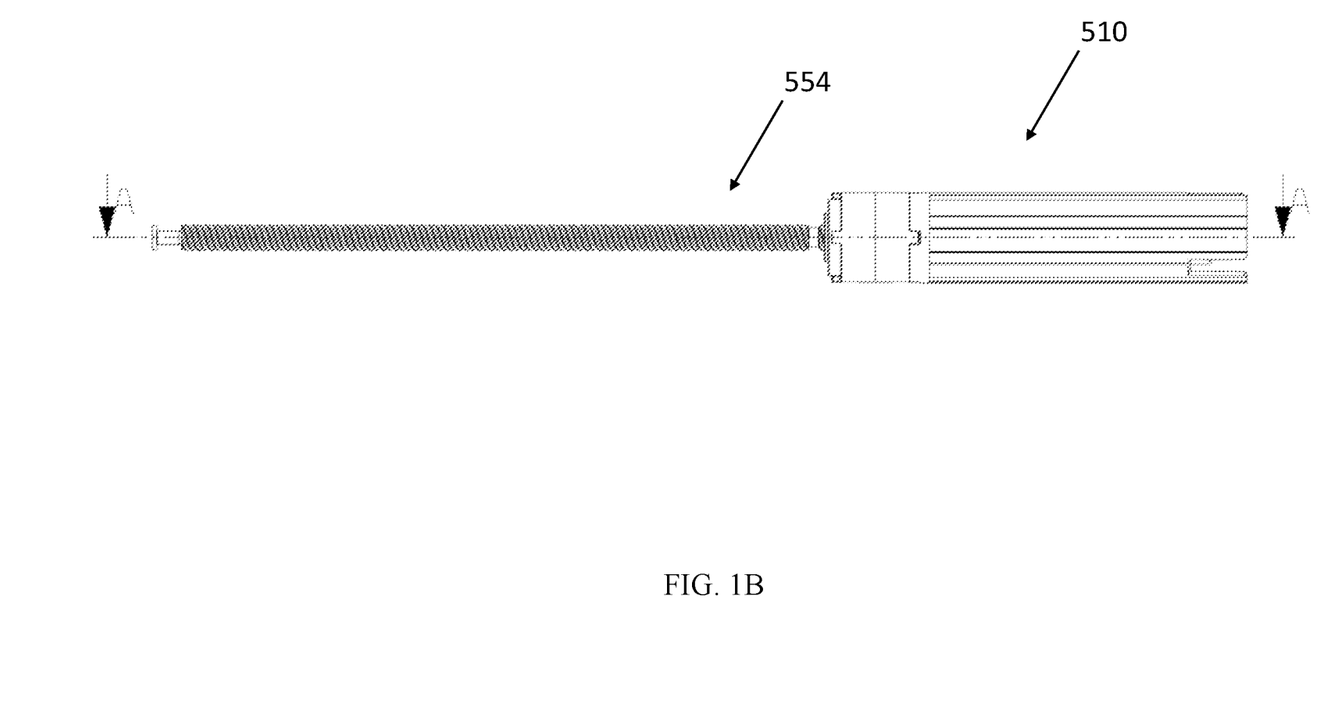
FIG. 1B is a front view of the power strut illustrating a motor housing and a lead screw in accordance with the present disclosure.
Figure 1C:
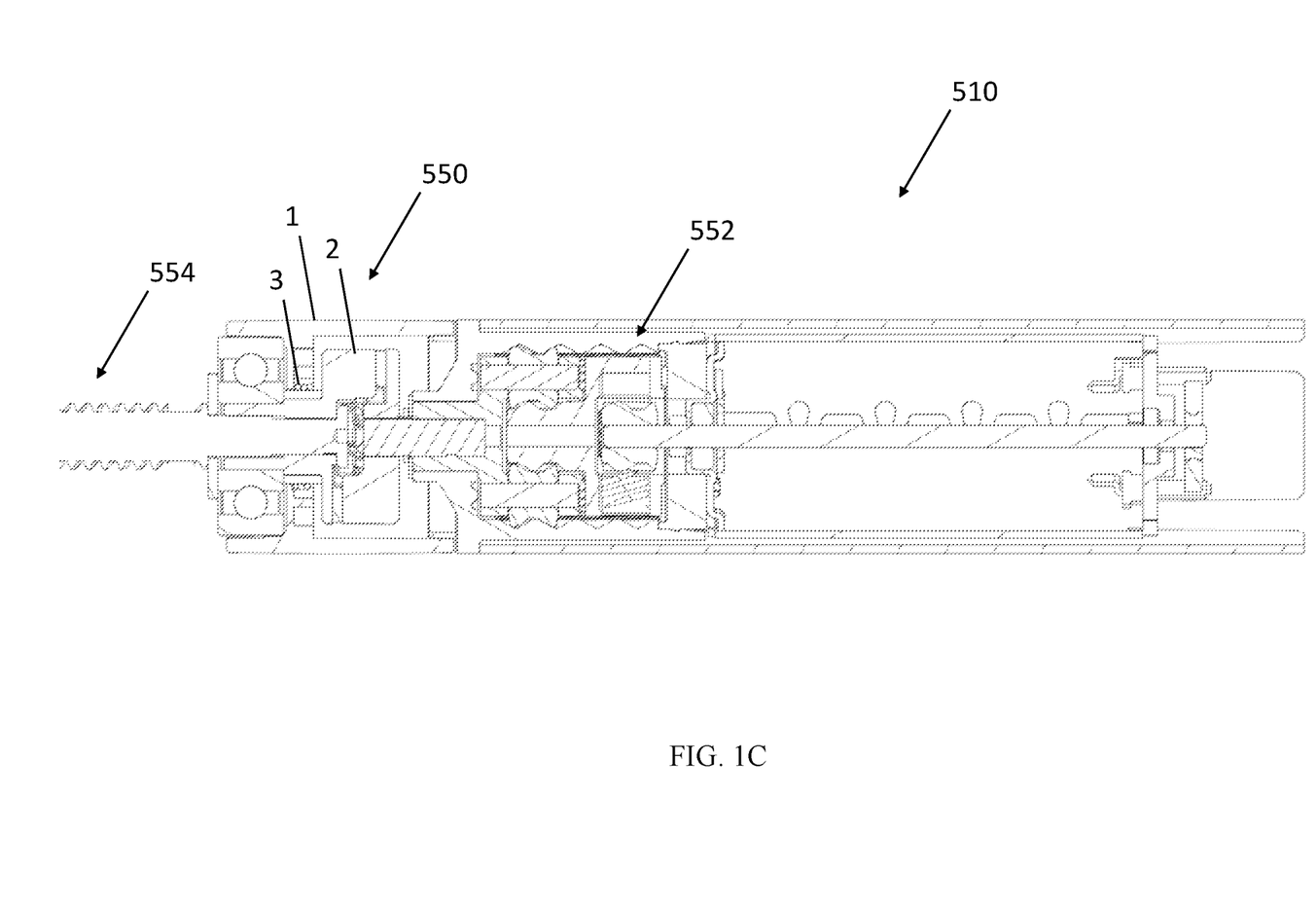
FIG. 1C is a sectional view taken along the line A-A of FIG. 1B, illustrating a damping device disposed between a planetary gearset and the leadscrew in accordance with the present disclosure.
Figure 1D:
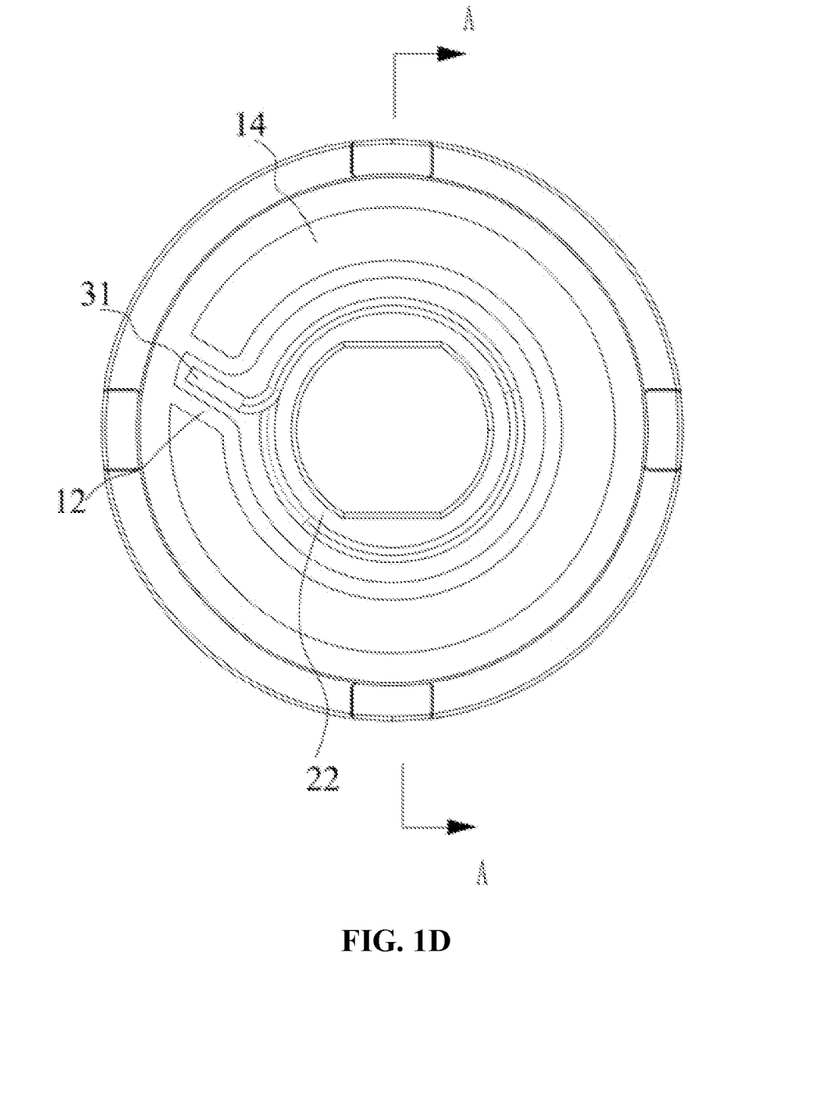
FIG. 1D is an end view of an anisotropic damping device in accordance with a first embodiment of the present disclosure, illustrating a shell, a spring, and a shaft sleeve, with a leg of the spring disposed within a notch of the shell.
Figure 2:
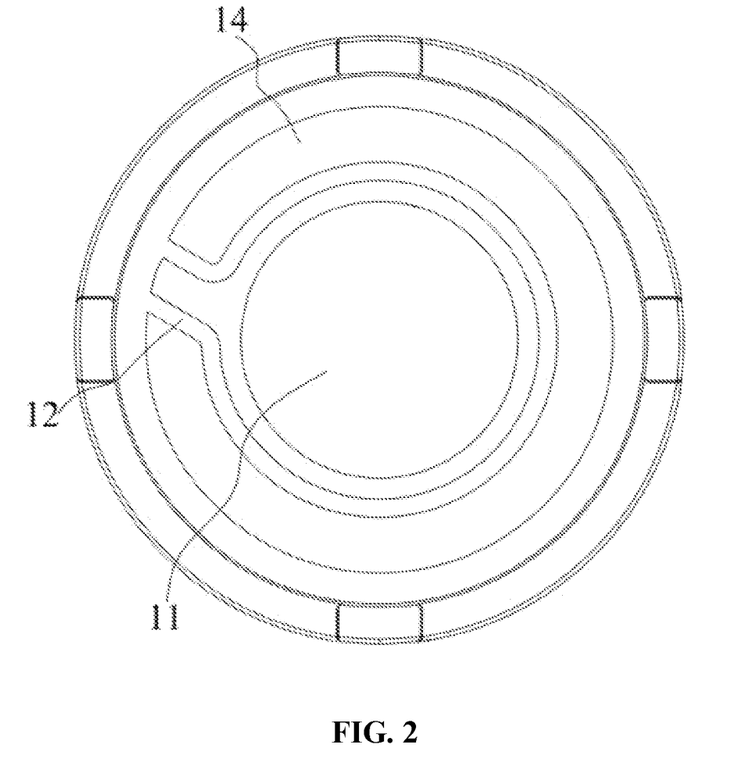
FIG. 2 is an end view of the shell of the anisotropic damping device in accordance with an aspect of the disclosure.

FIGS. 1B and 1C further illustrate one example of the present disclosure, including power strut 510, which includes damping device 550 disposed between planetary gear reduction mechanism 552 and lead screw 554 of the power strut 510. The damping device 550 may be used with other rotation-translation mechanisms and drive mechanisms in which frictional damping is desirable.

As shown in FIGS. 1D to 3, the anisotropic damping device 550 is shown in further detail, the damping device 550 usable with power strut 510 to provide different rotation friction as further described below. The anisotropic damping device includes a shell 1, a rotatable member 2 and a torsion spring 3. The shell 1 is provided with a through hole 11, the rotatable member 2 is inserted through the through hole 11, and is rotatably connected to the shell 1, the torsion spring 3 is sleeved on the rotatable member 2 and is in interference fit with the rotatable member 2, and the torsion spring 3 is provided with a first leg 31 fixedly connected to the shell 1. In a case where a direction of turning of the installed torsion spring 3 is right-handed, when the rotatable member 2 is rotated counterclockwise in FIG. 1D, the torsion spring 3 rotates counterclockwise along with the rotatable member 2 because the torsion spring 3 is in interference fit with the rotatable member 2. In this case, because the first leg 31 is fixedly connected to the shell 1, the torsion spring 3 slightly expands radially outward, thereby reducing an interference amount between the torsion spring 3 and the rotatable member 2 and generating a relatively small friction torque. When the rotatable member 2 is rotated clockwise in FIG. 1D, the torsion spring 3 rotates clockwise along with the rotatable member 2 because the torsion spring 3 is in interference fit with the rotatable member 2. In this case, because the first leg 31 is fixedly connected to the shell 1, the torsion spring 3 is slightly tightened in a radially inward direction against the rotatable member 2, thereby increasing the interference amount between the torsion spring 3 and the rotatable member 2 and generating a relatively large friction torque. This device may thereby generate different torque values in different rotation directions.

In one aspect, the shell 1 may include a first notch 12 (shown in FIGS. 1D and 2) in which the first leg 31 of the torsion spring 3 is disposed, and side walls of the first notch 12 are fixedly connected to the first leg 31. It will be appreciated that the figures may illustrate a gap on either side of the first leg 31 for illustrative purposes. In this aspect, the first notch 12 serves to fix the first leg 31. In other embodiments, the first leg 31 may also be fixed directly to the shell 1 by welding or the like.

Figure 3:
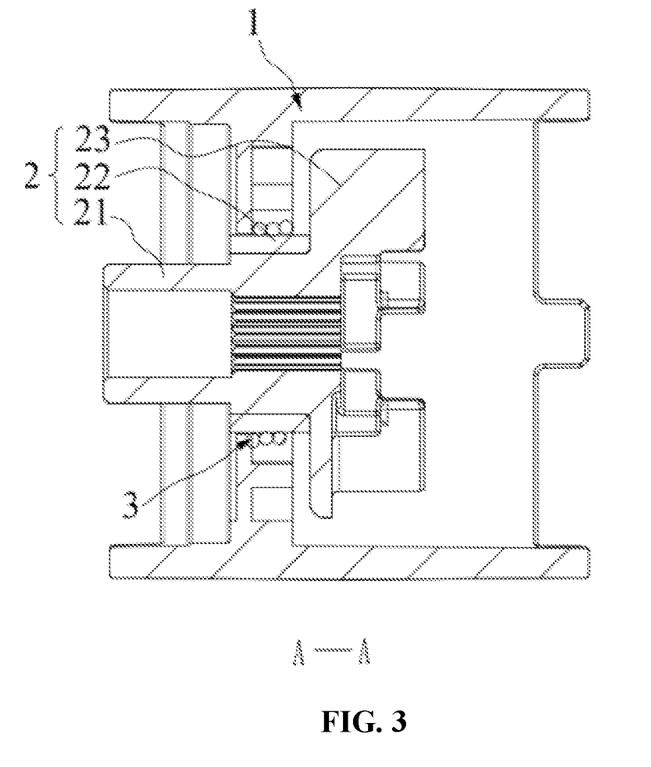
FIG. 3 is a sectional view taken along A-A of FIG. 1D.

In one aspect, the rotatable member 2 includes a rotating shaft 21 (shown in cross-section in FIG. 3) and a shaft sleeve 22, where the shaft sleeve 22 is sleeved on the rotating shaft 21 (such that the rotating shaft 21 extends through the shaft sleeve 22) and is fixedly connected to the rotating shaft 21, the torsion spring 3 is sleeved on the shaft sleeve 22 (such that the shaft sleeve 22 extends through the torsion spring 3) and is in interference fit with the shaft sleeve 22, and the shaft sleeve 22 is inserted through the through hole 11 (FIG. 2) and is rotatably connected to the shell 1 (such that the shaft sleeve 22 and rotating shaft 21 rotate together relative to the shell 1). In this embodiment, the shaft sleeve 22 is sleeved on the rotating shaft 21, and the shaft sleeve 22 is in interference fit with the torsion spring 3. In a case where the rotating shaft 21 rotates, the shaft sleeve 22, rotationally fixed with the rotating shaft 21, slides relative to the torsion spring 3, which may cause the shaft sleeve 22 to be worn in long-term use. As a result, the shaft sleeve 22 may be easily replaced regularly, and thus the design of the shaft sleeve 22 can reduce the maintenance and replacement cost of the overall device. FIG. 3 illustrates in cross-section the interface between the shaft sleeve 22 and the rotating shaft 21 of the rotatable member 2. The illustrated interface, shown in cross-section may represent both a splined connection or interference fit connection or other connection in which the shaft sleeve 22 is rotatably fixed to the rotating shaft 21 such that rotation of shaft causes rotation of shaft sleeve 22, and vice versa.

In one aspect, the rotating shaft 21 is provided with an external spline, the shaft sleeve 22 is provided with an internal spline, the shaft sleeve 22 is sleeved on the rotating shaft 21, and the internal spline and the external spline are pin-joined. In this embodiment, since the shaft sleeve 22 is fixedly connected to the rotating shaft 21, the pin joint is performed by the external spline and the internal spline in this embodiment. In other embodiments, the shaft sleeve 22 and the rotating shaft 21 are key-joined by a flat key, such as the inner profile of shaft sleeve 22 illustrated in FIG. 1D.

In one aspect, the shaft sleeve 22 is in interference fit with the rotating shaft 21. In this aspect, to prevent the shaft sleeve 22 from sliding along an axis of the rotating shaft 21, the shaft sleeve 22 is interference fit with the rotating shaft 21. In other embodiments, the shaft sleeve 22 may also be fixed to the rotating shaft 21 by a bolt which penetrates through the shaft sleeve 22 and is screwed to the rotating shaft 21. Other fixing mechanisms of the shaft sleeve 22 to the rotating shaft 21 may also be used.

In one aspect, the diameter of the through hole 11 is less than the outer diameter of the torsion spring 3, as shown in FIG. 3. In this aspect, the diameter of the through hole 11 is provided to be less than the outer diameter of the torsion spring 3 so as to prevent the torsion spring 3 from moving axially (to the left in FIG. 3) along the axis of the rotating shaft 21 during use.

In one aspect, the rotatable member 2 further includes a driving ring 23 (shown in FIG. 3), the rotating shaft 21 extends into the through hole 11 and is fixedly connected to the driving ring 23, the driving ring 23 is disposed apart from the shell 1, and a diameter of the driving ring 23 is not less than (put another way, is greater than or equal to) the outer diameter of the torsion spring 3. In this aspect the driving ring 23 can play a role of transmitting power, and the driving ring 23 can also restrict the torsion spring 3 from moving axially in the other direction (to the right in FIG. 3, away from the through hole 11) along the axis of the rotating shaft 21. The driving ring 23 may be attached or connecting to the rotating shaft 21 integrally, such as being formed together as part of the same machining process, or they may be separate pieces that are fixed together In one aspect, the shell 1 is provided with a weight reduction groove 14. In this embodiment, the weight reduction groove 14 can reduce the material cost, and can also reduce the weight of the device.

Figure 4:
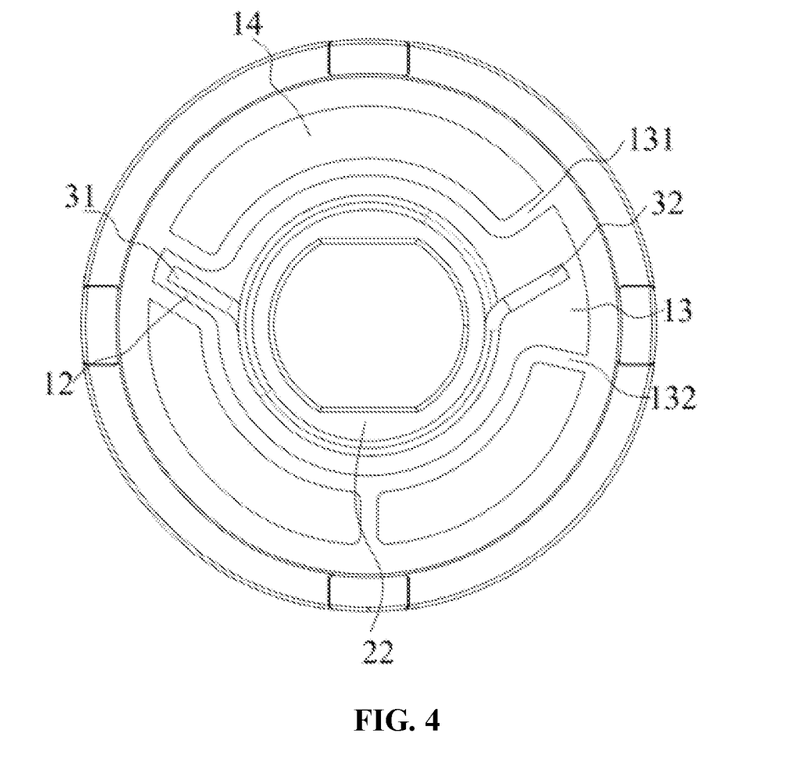
FIG. 4 is an end view of an anisotropic damping device in accordance with a second embodiment of the present disclosure, including a second leg of a spring disposed within a second notch of the shell.

In another aspect, as shown in FIG. 4, a further embodiment differs from the above-described first embodiment in that the torsion spring 3 further includes a second leg 32, the shell 1 further includes a second notch 13, and an opening width of the first notch 12 is less than an opening width of the second notch 13. The second leg 32 is disposed in the second notch 13, and the second leg 32 has a first state in which the second leg 32 abuts a first side wall 131 of the second notch 13 and a second state in which the second leg 32 abuts a second side wall 132 of the second notch 13. The first side wall 131 is opposite to the second side wall 132.

The second leg 32 therefore may slide in the second notch 13. In this embodiment, the second notch 13 plays a role of limiting, and an initial position of the second leg 32 is at a midpoint of a space between the first side wall 131 and the second side wall 132. In a case where the second leg 32 is in the first state, the rotating shaft 21 is at a maximum counterclockwise rotation angle, and in a case where the second leg 32 is in the second state, the rotating shaft 21 is at a maximum rotation angle at which the rotating shaft 21 rotates clockwise.

The above-described embodiments, as mentioned previously, may be used with an electric telescopic mechanism, such as an electromechanical strut or a power strut, which includes the anisotropic damping device 550 that provides different rotational friction in different rotational directions.

Figure 5:
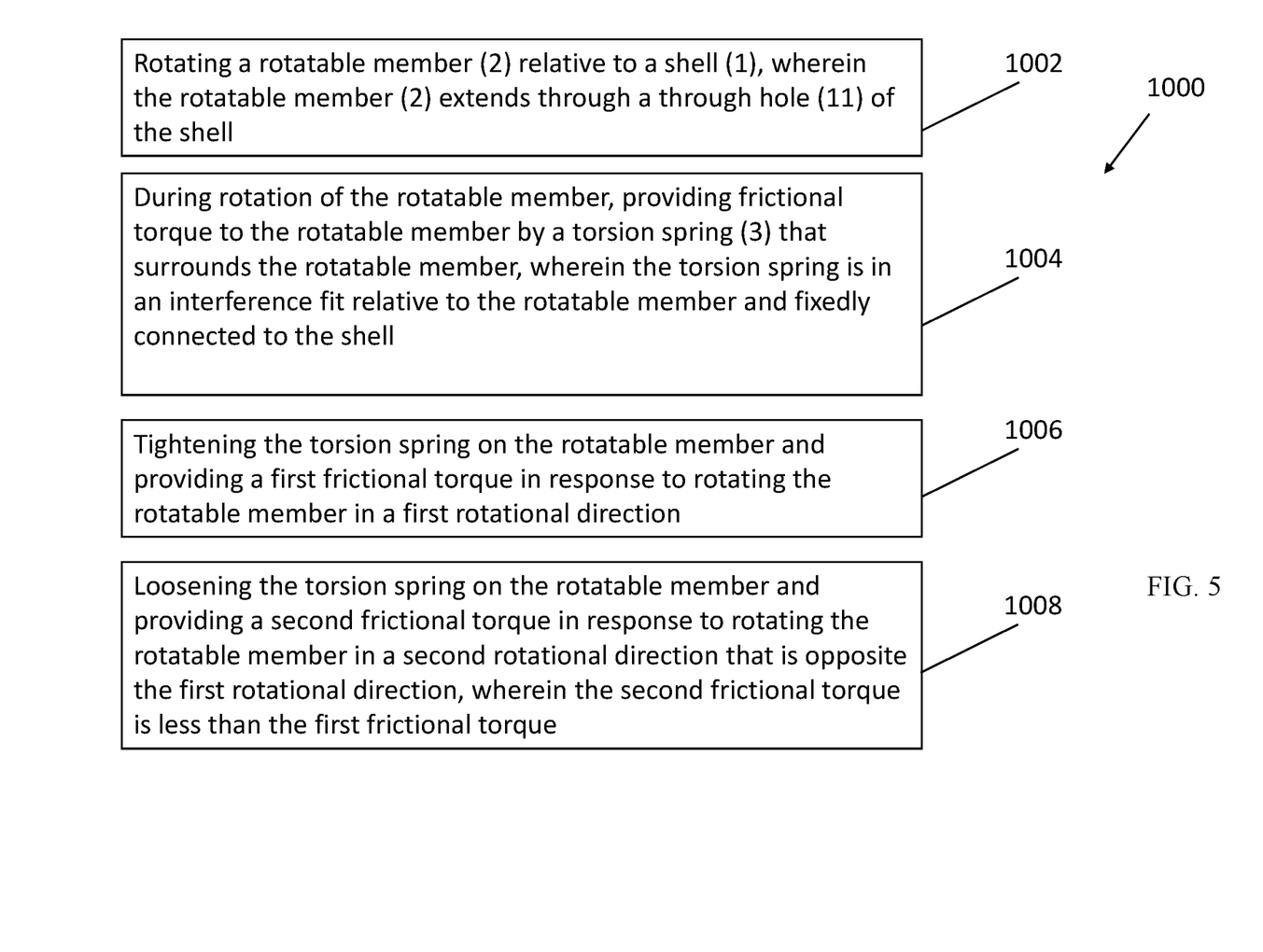
FIG. 5 illustrates a method of operating the damping device according to an aspect of the disclosure.

With reference to FIG. 5, a method 1000 for operating the damping device 550, for example with a power strut 510 or the like, for providing a different frictional torque to the rotatable member 2 of the damping device 550 is provided. The method 1000 includes the steps of: at step 1002, rotating a rotatable member 2 relative to a shell 1, wherein the rotatable member 2 extends through a through hole 11 of the shell; at step 1004, during rotation of the rotatable member, providing frictional torque to the rotatable member by a torsion spring 3 that surrounds the rotatable member, wherein the torsion spring is in an interference fit relative to the rotatable member and fixedly connected to the shell; at step 1006, tightening the torsion spring on the rotatable member and providing a first frictional torque in response to rotating the rotatable member in a first rotational direction; at step 1008, loosening the torsion spring on the rotatable member and providing a second frictional torque in response to rotating the rotatable member in a second rotational direction that is opposite the first rotational direction, wherein the second frictional torque is less than the first frictional torque.

It will be appreciated that the above-described embodiments and aspects of the present disclosure are merely example embodiments for clearly illustrating the present disclosure and are not intended to limit the implementations of the present disclosure. For those of ordinary skill in the art, changes or alterations in other different forms may also be made based on the preceding description. Implementations of the present disclosure cannot be and do not need to be all exhausted herein. Any modification, equivalent, improvement and the like made within the spirit and principle of the present disclosure shall be understood to be within the scope of the claims of the present disclosure.

What is claimed is:

1. A powered strut comprising:
a motor for rotating a planetary gearset;
a lead screw for moving an extensible member; and
an anisotropic damping device coupling the planetary gearset to the lead screw for providing rotational friction, the damping device comprising:
a shell (1),
a rotatable member (2), and
a torsion spring (3),
wherein the shell (1) defines a through hole (11),
wherein the rotatable member (2) extends through the through hole (11) and is rotatably connected to the shell (1) for rotation relative to the shell (1),
wherein the torsion spring (3) is sleeved on the rotatable member (2) and is in interference fit relative to the rotatable member (2), and
wherein the torsion spring (3) includes a first leg (31) fixedly connected to the shell (1);
wherein a frictional torque provided by the torsion spring (3) to the rotatable member (2) differs depending on the direction of rotation of the rotatable member (2) relative to the shell (1);
wherein the rotatable member (2) comprises a rotating shaft (21) and a shaft sleeve (22), wherein the shaft sleeve (22) is sleeved on the rotating shaft (21) and is fixedly connected to the rotating shaft (21), the torsion spring (3) is sleeved on the shaft sleeve (22) and is in interference fit with the shaft sleeve (22), and the shaft sleeve (22) extends through the through hole (11) and is rotatably connected to the shell (1) for rotation relative to the shell (1);
wherein the frictional torque provided by the torsion spring (3) to the rotatable member (2) is provided via the connection between the shaft sleeve (22) and the rotating shaft (21).

2. The powered strut of claim 1, wherein the shell (1) comprises a first notch (12), the first leg (31) is disposed in the first notch (12), and side walls of the first notch (12) are fixedly connected to the first leg (31).

3. The powered strut of claim 2, wherein the torsion spring (3) further comprises a second leg (32), the shell (1) further comprises a second notch (13), and an opening width of the first notch (12) is less than an opening width of the second notch (13); and
wherein the second leg (32) is disposed in the second notch (13), and the second leg (32) has a first state in which the second leg (32) abuts a first side wall (131) of the second notch (13) and a second state in which the second leg (32) abuts a second side wall (132) of the second notch (13), wherein the first side wall (131) is opposite to the second side wall (132).

4. The powered strut of claim 1, wherein the rotating shaft (21) is provided with an external spline, the shaft sleeve (22) is provided with an internal spline, the shaft sleeve (22) is sleeved on the rotating shaft (21), and the internal spline is connected to the external spline.

5. The powered strut of claim 4, wherein the shaft sleeve (22) is in interference fit with the rotating shaft (21).

6. The powered strut of claim 1, wherein a diameter of the through hole (11) is less than an outer diameter of the torsion spring (3).

7. The powered strut of claim 6, wherein the rotatable member (2) further comprises a driving ring (23), the rotating shaft (21) extends through the through hole (11) and is fixedly connected to the driving ring (23), the driving ring (23) is disposed spaced away from the shell (1), and a diameter of the driving ring (23) is greater than or equal to the outer diameter of the torsion spring (3).

8. The powered strut of claim 1, wherein the shell (1) includes a weight reduction groove (14).

9. A power strut (510) comprising:
a housing (512, 514):
a drive mechanism (552) disposed within the housing and extending along a longitudinal axis;
a lead screw (554) extending along the longitudinal axis operatively connected to the drive mechanism, wherein rotation of the drive mechanism causes rotation of the lead screw (554);
an extensible member (516) operatively coupled to the lead screw, wherein rotation of the lead screw causes extension of the extensible member;
an anisotropic damping device (550) disposed between the drive mechanism and the lead screw, wherein rotation of the drive mechanism is transmitted to the lead screw via the damping device;
wherein the anisotropic damping device comprises:
a shell (1) having a through hole (11),
a rotatable member (2) extending through the through-hole, wherein the rotatable member is rotatable relative to the shell, and
a torsion spring (3) fixedly connected to the shell and extending around the rotatable member, the torsion spring in an interference fit relative to the rotatable member, wherein the torsion spring provides a frictional torque on the rotatable member in response to rotation of the rotatable member relative to the shell;
wherein a frictional torque provided by the torsion spring (3) to the rotatable member (2) differs depending on the direction of rotation of the rotatable member (2) relative to the shell (1);
wherein the rotatable member includes a shaft sleeve extending around a rotational shaft portion and rotationally fixed thereto, wherein the torsion spring is in interference fit with the shaft sleeve.

10. The power strut of claim 9, wherein the torsion spring (3) includes a first leg (31) fixedly connected to the shell (1).

11. The power strut of claim 9, wherein rotation of the rotatable member in a first rotational direction tightens the torsion spring on the rotatable member and increases the frictional torque, and rotation of the rotatable member in a second rotation direction opposite the first rotational direction loosens the torsion spring on the rotatable member and decreases the frictional torque.

12. The power strut of claim 10, wherein the torsion spring includes a second leg (32) connected to the shell and moveable relative to the shell in response to rotation of the rotatable member.

13. The power strut of claim 12, wherein the first leg is disposed within a first notch of the shell and the second leg is disposed within a second notch of the shell, wherein the second notch is larger than the first notch, and where rotation of the rotatable member in opposite rotation directions causes the second leg to contact opposing sides of the second notch.

14. A method of providing different frictional torque to a rotatable member coupling a lead screw to a planetary gearset, the method comprising:
rotating a rotatable member (2) of a damping device relative to a shell (1), wherein the rotatable member (2) extends through a through hole (11) of the shell;
wherein the rotatable member couples a lead screw to a planetary gearset;
during rotation of the rotatable member, providing frictional torque to the rotatable member by a torsion spring (3) that surrounds the rotatable member, wherein the torsion spring is in an interference fit relative to the rotatable member and fixedly connected to the shell;
tightening the torsion spring on the rotatable member and providing a first frictional torque in response to rotating the rotatable member in a first rotational direction;
loosening the torsion spring on the rotatable member and providing a second frictional torque in response to rotating the rotatable member in a second rotational direction that is opposite the first rotational direction, wherein the second frictional torque is less than the first frictional torque;
wherein the rotatable member includes a shaft sleeve extending around a rotational shaft portion and rotationally fixed thereto, wherein the torsion spring is in interference fit with the shaft sleeve.

15. The method of claim 14, wherein the torsion spring includes a first leg (31) fixedly disposed in a first notch (12) of the shell (1).

16. The method of claim 15, wherein the torsion spring includes a second leg (32) disposed in a second notch (13) of the shell (1), wherein the second notch is larger than the first notch.

17. The method of claim 16, wherein the second leg slides within the second notch during rotation of the rotatable member.

18. The method of claim 17, wherein the second notch has opposite sides (131, 132), wherein the second leg contacts the opposite sides (131, 132) in response to rotation in opposite rotational directions.

* * * * *